US009130661B2

(12) United States Patent
Poledna

(10) Patent No.: US 9,130,661 B2
(45) Date of Patent: Sep. 8, 2015

(54) METHOD AND MASTER CLOCK FOR GENERATING FAIL-SILENT SYNCHRONIZATION MESSAGES

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 0 days.

(21) Appl. No.: 14/391,161

(22) PCT Filed: Apr. 9, 2013

(86) PCT No.: PCT/AT2013/050083
§ 371 (c)(1),
(2) Date: Oct. 7, 2014

(87) PCT Pub. No.: WO2013/152378
PCT Pub. Date: Oct. 17, 2013

(65) Prior Publication Data
US 2015/0098492 A1    Apr. 9, 2015

(30) Foreign Application Priority Data
Apr. 11, 2012 (AT) .................................. A 432/2012

(51) Int. Cl.
*H04B 1/707* (2011.01)
*H04B 1/7087* (2011.01)
(Continued)

(52) U.S. Cl.
CPC ............... *H04B 1/7087* (2013.01); *G06F 1/14* (2013.01); *H04J 3/0641* (2013.01); *H04J 3/0688* (2013.01); *H04L 1/22* (2013.01); *H04L 41/0654* (2013.01); *H04L 43/106* (2013.01); *H04J 3/0661* (2013.01)

(58) Field of Classification Search
CPC . H04J 3/0641; H04L 41/0654; H04L 43/106; H04H 20/18; H04W 56/0015
USPC .................................................. 375/145, 149
See application file for complete search history.

(56) References Cited

U.S. PATENT DOCUMENTS 6,256,507 B1    7/2001 Lemieux
6,687,752 B1    2/2004 Falco et al.
(Continued)

FOREIGN PATENT DOCUMENTS

WO    2004066530 A1    8/2004

OTHER PUBLICATIONS

"International Search Report and Written Opinion for International Application PCT/AT203/050083", completed Jul. 9, 2013, 14 pgs.
(Continued)

*Primary Examiner* — Don N Vo
(74) *Attorney, Agent, or Firm* — KPPB LLP

(57) ABSTRACT

Embodiments of the disclosed invention relate to a method for generating fail-silent synchronization messages in a distributed real-time system including a satellite receiver, a precision reference clock, a central computer, a monitor and a data block for storing configuration parameters. The satellite receiver periodically generates a time signal (S-signal) based upon time signals received from a satellite, and the reference clock periodically produces an actual time signal (R-signal) having a nominal frequency and phase identical to the frequency and phase of the S-signal. A periodic synchronization message is generated by the central computer based upon the S-signal the R-signal and parameters stored by the central computer. The monitor checks whether the transmission time contained in the synchronization message matches the actual transmission time and whether the distance between two successive synchronization messages lies within a tolerance interval; and if not, modifies the synchronization message such that the synchronization message is erroneous.

18 Claims, 1 Drawing Sheet

(51) Int. Cl.
  *H04L 12/26* (2006.01)
  *H04L 12/24* (2006.01)
  *G06F 1/14* (2006.01)
  *H04L 1/22* (2006.01)
  *H04J 3/06* (2006.01)

(56) References Cited

U.S. PATENT DOCUMENTS

| | | |
|---|---|---|
| 7,800,534 B1 | 9/2010 | Yenney et al. |
| 2009/0225743 A1 | 9/2009 | Nicholls et al. |
| 2010/0260168 A1* | 10/2010 | Gheorghiu et al. ........... 370/350 |
| 2012/0189069 A1* | 7/2012 | Iannuzzelli et al. .......... 375/259 |
| 2012/0316743 A1* | 12/2012 | DeSanzo et al. ................ 701/70 |
| 2014/0044009 A1* | 2/2014 | Piesinger ...................... 370/254 |

OTHER PUBLICATIONS

Warner et al., "GPS Spoofing Countermeasures", Dec. 1, 2003, printed from www.homelandsecuirty.org/bulletin/udal%20benefit/warner_gps_spoofing.html, 8 pgs.

* cited by examiner

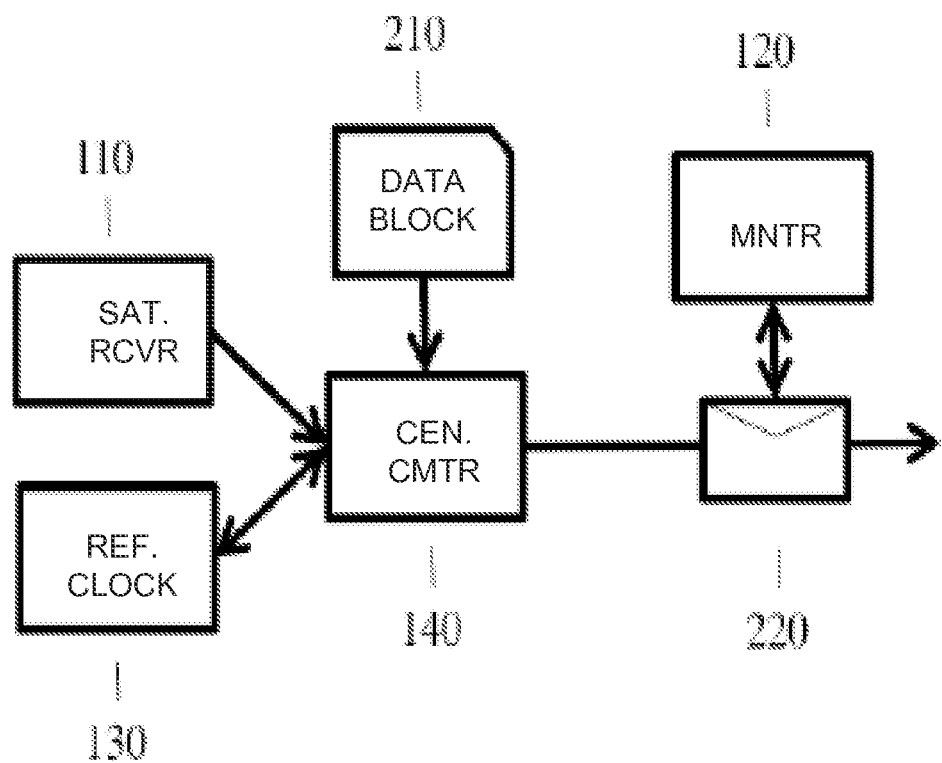

METHOD AND MASTER CLOCK FOR GENERATING FAIL-SILENT SYNCHRONIZATION MESSAGES

CROSS REFERENCE TO RELATED APPLICATIONS

This application is a national phase 35 U.S.C. §371 filing of PCT application PCT/AT2013/050083 filed on Apr. 9, 2013 and having a priority date of Apr. 11, 2012 that is hereby incorporated by reference as if set forth herewith.

SUMMARY OF THE INVENTION

The invention relates to a method for generating fail-silent synchronisation messages in a distributed real-time system.

The invention also relates to an apparatus for carrying out such a method.

The present invention lies in the field of computer technology. The invention describes an innovative method for reliably generating synchronisation messages conforming to SAE Standard AS6802 of TT Ethernet and IEEE Standard 1588 from satellite signals by means of a master clock.

BRIEF DESCRIPTION OF THE DRAWING

FIG. 1 illustrates a distributed real-time system in accordance with embodiments of the invention.

DETAILED DESCRIPTION

In a distributed fault-tolerant real-time system, in which a number of computers control a physical process, it is advantageous when all computers have a fault-tolerant physical time base conforming to the TAI Standard [7]. Such a time base can be established by the receipt of periodic synchronisation messages, which are transmitted by a fault-tolerant master clock. A synchronisation message, in the data field thereof, contains the moment in time of the transmission by the master clock.

A method will be described hereinafter, explaining how such a fault-tolerant master clock, which generates reliable synchronisation messages conforming SAE Standard AS6802 of TT Ethernet [8] and IEEE Standard 1588 [9], can be established.

The terms used in this document will be explained hereinafter. An Ethernet message contains a header, a data field and a redundant CRC field. In a correct closed message, the CRC field is consistent with the content of the message. A message is open when no consistent CRC field exists. When a modification is to be made in the data field of a message, the message must therefore first be opened. As the message is opened, it is checked whether the content of the closed message is consistent with the CRC field. When this is not the case, the message is rejected. After carrying out the modification in the data field of the open message, the message must be closed again, that is to say a new consistent CRC field has to be calculated before the message can be sent further. When a modification is made in an open message, a transient fault (for example an SEU (single event upset) due to the natural cosmic radiation) occurring during the modification may induce a fault in the message, which also remains following closure of the message.

In the field of computer reliability, the term "fault-containment unit" (FCU) has central significance [7, p. 136]. An FCU is understood to be an encapsulated sub-system, wherein the immediate effects of a fault cause are limited to this subsystem.

The quality of a real-time clock is characterised by the accuracy [7]. When two real-time clocks are compared, a distinction is thus made between the state difference and the timing rate difference. When the state of a real-time clock regularly deviates from a reference clock, this indicates a timing rate difference, which can be corrected by means of a digital micro/macro tick transformation logic.

The object of the invention is to specify a solution for generating reliable synchronisation messages, in particular conforming to the SAE Standard AS6802 of TT Ethernet [8] and IEEE Standard 1588 [9].

This object is achieved with a method according to the invention in that the method uses the following functional units: a satellite receiver for receiving a time signal (S-signal) from a navigation satellite system, a precise reference clock, which generates an actual time signal (R-signal), a central computer, a monitor and a data block for storing configuration parameters, wherein the satellite receiver periodically generates an S-signal, and wherein the reference clock periodically produces an R-signal, wherein the nominal frequency and phase of the R-signal is identical to the frequency and phase of the S-signal, and wherein the difference between the nominal and actual R-signal is used in order to minimise this difference in the future, and wherein, in the normal case of the satellite receiver, the periodic synchronisation message, which is to be generated in accordance with the configuration parameters by the central computer, is generated on the basis of the S-signal, and the difference between the nominal and actual R-signal is used in order to adapt (preferably in the short term) the state and (preferably in the long term) the timing rate of the reference clock to the S-signal, and wherein, in the case of an anomaly of the satellite receiver the timing rate adaptation of the reference clock is suspended, and wherein in the case of a fault of the satellite receiver, the periodic synchronisation message, which is to be generated in accordance with the configuration parameters by the central computer, is generated on the basis of the R-signal, and wherein the monitor checks whether the transmission time contained in the synchronisation message matches the actual transmission time and whether the distance between two successive synchronisation messages lies within an a priori fixed tolerance interval, and, if this is not the case, modifies the synchronisation message in such a way that each receiver identifies the synchronisation message as erroneous.

The core of the present invention lies in the fact that a master clock has three independent time sources, which alternately check and supplement: (1) a periodic time signal from a satellite receiver, (2) a periodic time signal of a local reference clock and (3) a periodic time source of an independent monitor. In the normal case, the time signal of the satellite receiver is used by a central computer of the master clock as the basis for the generation of the periodic synchronisation message, and the timing rate of the local reference clock is adapted to the timing rate of the satellite receiver. When an anomaly occurs, for example when the field strength of the satellite signals changes outside the normal interval, a timing rate correction of the reference clock is then not performed. When a fault or failure of the satellite signal is determined by the central computer, the reference clock thus forms the basis for the generation of the periodic synchronisation message. Parallel to the central computer, an independent monitor checks the content of each synchronisation message and the distance over time between successive synchronisation messages, without opening the synchronisation message, in order to identify faults that have occurred prior to the closure of the synchronisation message. When a fault is identified by the monitor, the outbound synchronisation message is interrupted or modified in such a way that each receiver can identify the modified synchronisation message as erroneous. It is thus ensured with a high level of probability that a syntactically correct synchronisation message is also correct in terms of content. When two independent master clocks are used in a system, the failure of one master clock is thus tolerated in the system.

The basic innovation of the present method concerns the establishment of a master clock for the generation of periodic fail-silent Ethernet-compatible synchronisation messages, which provides the physical time, as defined by the GPS system, in a distributed real-time system and which identifies faults caused by the failure of the hardware or security attacks, and tolerates said faults in part. With use of two or more such independent master clocks, a fault-tolerant synchronisation can be established.

The methods described in the prior art for creating synchronisation messages [3, 4] on the basis of satellite signals do not detail problems concerning the security and fault tolerance of a master clock.

The present invention discloses an innovative method and an apparatus for the reliable generation of synchronisation messages conforming to SAE Standard AS6802 of TT Ethernet and IEEE Standard 1588 for the establishment of a reliable physical time base in a distributed real-time system. In accordance with the invention, a fail-silent master clock is established from three fault-containment units, that is to say a satellite receiver, a central computer with a reference clock, and an independent monitor with a dedicated clock. In the normal case, the synchronisation message is generated on the basis of the time signal of the satellite receiver, and the timing rate of the reference clock is adapted to the timing rate of the satellite signal. The exact distance over time between the periodic synchronisation messages is additionally monitored by an independent monitor. When the monitor identifies a fault, the outbound synchronisation message is modified in such a way that each receiver can identify the modified synchronisation message as erroneous. In the event of a failure of the time signal generated by the satellite receiver, the time signal of the reference clock is used as a basis for the generation of a synchronisation message. When a second fail-silent master clock is used in a distributed real-time system, the total failure of one of the two master clocks can thus be tolerated.

Further advantageous embodiments of the method according to the invention are described as follows and can be implemented additionally, alternatively or in any combination with one another. Here, it may be that the monitor after start-up enters an initial phase, during which the distance between successive synchronisation messages is measured and in the following operating phase the measured distance is used to identify an erroneous distance of two successive synchronisation messages;

the central computer periodically generates a diagnosis message, in which the operating state and any anomalies or faults of the overall system during the previous period are contained;

the data stored in the configuration data block is secured with fault-identifying codes;

the data stored in the configuration data block is secured with fault-correcting codes;

the parameters stored in the configuration data block can only be changed when a physical connection exists between an external input device and the central computer;

the parameters stored in the configuration data block can be changed via the Internet with a cryptographically secured protocol;

the satellite receiver measures the field strength of the satellite signals and communicates with the central computer so as to be able to identify anomalies in the satellite signals;

the synchronisation message is secured by an electronic signature;

the syntactic structure of the synchronisation message corresponds to SAE Standard AS6802;

the syntactic structure of the synchronisation message corresponds to IEEE Standard 1588;

the S-signals are generated on the basis of the satellite signals from the GPS system, and/or the S-signals are generated on the basis of the satellite signals from the Galileo system, and/or the S-signals are generated on the basis of the satellite signals from the GLANOSS system;

after the end of the failure of the satellite receiver, the R-signal generated by the reference clock is brought with a maximum predefined timing rate difference to the S-signal provided again in order to dispel the clock state difference between the R-signal and the S-signal accumulated during the failure.

The invention will also be achieved with an apparatus of the type mentioned in the introduction, in particular a master clock, for carrying out the method according to the invention.

The apparatus preferably derives the R-signal of the reference clock from a temperature-compensated quartz, or the R-signal of the reference clock is derived from an atomic clock.

The present invention will be explained by way of example on the basis of the following drawing. The sole figure (FIG. 1) shows the inner structure of a fail-silent master clock.

FIG. 1 shows a structural diagram of the fail-silent master clock. The master clock consists of three fault-containments unit (FCUs), (1) the satellite receiver 110, (2) the central computer 140 with the reference clock 130, and (3) the monitor 120. The parameters that define the exact function of the master clock are stored in the configuration data block 210. The data stored in the configuration data block 210 can be secured with fault-identifying or fault-correcting codes. The parameters are loaded into the configuration data block 210 via a physical connection between an input device and the master clock in order to prevent a security attack via the Internet. Alternatively, the configuration data block can be loaded with use of a cryptographically secured protocol via the Internet.

The satellite receiver 110 sends periodic time signals, the S-signals, to the central computer 140. Parallel thereto, the independent reference clock 130 sends periodic time signals, the R-signals, to the central computer 140. In the fault-free state, the S-signals and the nominal R-signals are to be identical in terms of timing rate and phase.

An accurate clock, for example a temperature-compensated oscillator or an atomic clock, is located in the reference clock. The primary signal generated by this accurate clock is transformed by a digital micro/macro-tick transformation unit in the reference clock 130 into the R-signal, which is expected at the interface to the central computer 140. This digital micro/macro-tick transformation unit can be parameterised by the central computer, such that the state and the timing rate of the R-signal output by the reference clock 130 can be digitally modified. In the normal case, the difference between the time signal from the satellite receiver 110, the S-signal, and the actual time signal from the reference clock 130, the R-signal, is measured by the central computer 140, and the micro/macro-tick transformation unit is parameterised in such a way that the actual R-signal from the reference clock 130 is adapted to the nominal R-signal (predefined by the S-signal of the satellite receiver). This adaptation occurs in two ways. In the short term, the state of the R-signal is adapted to the state of the S-signal. In the long-term, the timing rate of the R-signal is adapted to the timing rate of the S-signal. As a result of this adaptation of the timing rate of the reference clock 130 to the S-signal predefined by the satellite system, the accuracy of the drift of the R-signal can be improved by up to two orders of magnitude [7, p. 72].

The satellite receiver 130 receives the navigation signals from a navigation satellite system [6], for example from the GPS system, the GLANOSS system or the future Galileo system, and monitors the field strength of these signals. This monitoring of the field strength is carried out in order to discover any security attacks on the satellite signal, for example the GPS signal. In the fault-free state, the field strengths of the GPS signal are in a common interval, which is determined by the measurement of the occurring field strengths over a long period of time. When these field strengths change drastically spontaneously and are outside the common interval, this indicates a security attack. In principle, a distinction can be made between two types of security attacks on a satellite signal: blocking or spoofing [5]. In the case of blocking, the GPS signal is disturbed, such that the satellite receiver cannot receive syntactically correct messages. Blocking attacks are easily identified by the satellite receiver, since the signal practically disappears. In the case of spoofing, a falsified syntactically correct signal is generated in order to confuse the receiver. Since the falsified spoofing signal is to overlap the authentic GPS signal, the field strength of the spoofing signal must lie outside the common range. There is an intermediate area between the common field strength and a uniquely identified fault state by spoofing, said intermediate area being referred to as an anomaly. As soon as an anomaly is identified, the timing rate correction of the reference clock is suspended in order to prevent a potential false adaptation of the clock timing rate of the reference clock to a non-authentic satellite signal.

In the fault-free case, the central computer 140 periodically generates an Ethernet-compatible synchronisation message 220 on the basis of the S-signal from the satellite receiver 110, said synchronisation message conforming to the SAE Standard AS6802 of TT Ethernet or IEEE Standard 1588. The parameters of this message (frequency and phase) are taken from the configuration data block 210. If necessary, the synchronisation message can be protected by an electronic signature [7] in order to ensure the authenticity of the message. The central computer 140 closes the closed synchronisation message 220 by the calculation and addition of the CRC polynomial and sends the message to the designated receivers precisely at the transmission time contained in the message.

When the S-signal disappears at the interface between the satellite receiver 110 and the central computer 120 or when a spoofing attack on the satellite signal has been determined by the central computer, the central computer 140 thus generates the synchronisation message 220 on the basis of the R-signal from the reference clock 130. As soon as a correct S-signal is available again, the central computer determines the state difference between the R-signal and the S-signal and changes the timing rate of the reference clock 130 via the parameters of the micro/macro tick transformation unit until the R-signal again matches the S-signal. Here, a maximum a priori fixed deviation, contained in the configuration data block 220, of the timing rate of the reference clock from the timing rate of the satellite signal is not exceeded. As soon as the state of the R-signal has reached the state of the S-signal, the central computer 140 again forms the synchronisation message on the basis of the S-signal.

In normal operation, the outbound closed synchronisation message 220 is checked by the monitor 120 in the cut through method. Here, the distance over time between two successive synchronisation messages 220 is measured with the clock of the monitor 120, and the content of the synchronisation message is checked. If the distance over time between two successive synchronisation messages 220 lies outside a previously determined tolerance interval or when a content-based fault is identified, the outbound closed synchronisation message 220 is modified in such a way that, for example as a result of premature interruption of the transmission process, each receiver of the synchronisation message 220 can identify the synchronisation message as erroneous. The monitor additionally sends a fault message with the fault reason to the central computer 140.

The tolerance interval, which specifies the permissible distance between two successive synchronisation messages 220, is determined in the initialisation phase of the master clock by measuring the message distance of a quantity of synchronisation messages by the monitor 120. Alternatively, the length of this tolerance interval can be specified in the configuration data block 210.

The central computer 140 periodically sends (the period is fixed in the configuration data block 210) a diagnosis message to a designated diagnosis computer. All essential parameters, such as measured field strength of the satellite signal, timing rate and state difference of the actual R-signal and any fault messages occurred during the last period, are communicated to the diagnosis computer in this diagnosis message.

CITED LITERATURE

[1] U.S. Pat. No. 5,694,542 Kopetz, H. Time-triggered communication control unit and communication method. Granted Dec. 2, 1997.

[2] U.S. Pat. No. 7,839,868. Kopetz, H. Communication method and system for the transmission of time-driven and event-driven Ethernet messages. Granted Nov. 23, 2010.

[3] U.S. Pat. No. 8,089,991 Ungermann. Network and method for clock synchronization of clusters in a time triggered network. Granted Jan. 3, 2012.

[4] U.S. Pat. No. 8,018,950 Wu, et al. Systems and methods for distributing GPS clock to communications devices. Granted Sep. 13, 2011

[5] Warner, J. et. al. *GPS Spoofing Countermeasures*, Los Alamos National Laboratory. URL: http://lewisperdue.com/DieByWire/GPS-Vulnerability-LosAlamos.pdf

[6] Hofmann-Wellenhof, B. et al. *GNSS—Global Navigation Satellite Systems: GPS, GLONASS, Galileo, and more*. Springer publishing house, 2007

[7] Kopetz, H. *Real-Time Systems, Design Principles for Distributed Embedded Applications*. Springer publishing house. 2011.

[8] SAE Standard AS6802 von TT Ethernet. URL: http://standards.sae.org/as6802

[9] IEEE 1588 *Standard for a Precision Clock Synchronization Protocol for Network Measurement and Control Systems*. URL: http://www.ieee1588.com/

What is claimed is:

1. A method for generating fail-silent synchronisation messages in a distributed real-time system, the method comprising: receiving a time signal (S-signal) from a navigation satellite using a satellite receiver periodically generating an S-signal based upon the received S-signal using the satellite receiver, periodically producing an actual time signal (R-signal) using a reference clock wherein the nominal frequency and phase of the R-signal is substantially identical to the frequency and phase of the S-signal, determining a difference between the S-signal and the R-signal generated by the reference clock, adjusting the R-signal generated by the reference clock based upon the difference, determining whether a fault occurs in the generation of the S-signal by the satellite receiver using a central computer, generating a periodic synchronization message based upon the S-signal using the central computer in response to a determination that a fault has not occurred wherein the periodic synchronization message is generated in accordance with configuration parameters stored in a data block accessible by the central computer, adapting a state and a timing rate of the reference clock based upon the difference between the S-signal and R-signal in response to a determination that a fault has not occurred in the generation of the S-signal, suspending a timing rate adaptation of the reference clock in response to a determination of a fault in the generation of the S-signal, and generating a periodic synchronisation message based upon the R-signal using the central computer in response to a determination that a fault has occurred wherein the periodic synchronization message is generated in accordance with configuration parameters stored in a data block accessible by the central computer, determining whether the transmission time contained in the periodic synchronisation message matches the actual transmission time and whether the distance between two successive periodic synchronisation messages lies within a fixed tolerance interval using a monitoring system, and modifying the synchronisation message in such a way that each receiver identifies the synchronisation message as erroneous using the monitoring system in response to at least one of a determination that the transmission time in the periodic message does not match the actual transmission time and the distance is not with the fixed tolerance interval.

2. The method according to claim 1, further comprising measuring the distance between two successive periodic synchronisation messages using the monitoring system during an initial phase and using the measured distance to identify an erroneous distance between two successive synchronisation messages using the monitoring system during an operating phase.

3. The method according to claim 1, further comprising periodically generating a diagnosis message using the central computer where an operating state, anomalies, and faults of the overall system during a previous period are contained.

4. The method according to claim 1, further comprising securing the data stored in the configuration data block with fault-identifying codes.

5. The method according to claim 1, further comprising securing data stored in the configuration data block with fault-correcting codes.

6. The method according to claim 1, permitting the parameters stored in the configuration data block to be changed only when a physical connection exists between an external input device and the central computer.

7. The method according to claim 1, that permitting the parameters stored in the configuration data block to be changed via the Internet using a cryptographically secured protocol.

8. The method according to claim 1, measuring a field strength of satellite signals using the satellite receiver and communicating the measured field strength from the satellite receiver to the central computer in order to be able to identify anomalies in the satellite signals.

9. The method according to claim 1, further comprising securing a periodic synchronisation message by an electronic signature.

10. The method according to claim 1, where a syntactic structure of the synchronisation message corresponds to SAE Standard AS6802.

11. The method according to claim 1, where a syntactic structure of the synchronisation message corresponds to IEEE Standard 1588.

12. The method according to claim 1, where the generating of the S-signals by the satellite receiver include generating the S-signals on the basis of satellite signals by the GPS system.

13. The method according to claim 1, where the generating of the S-signals by the satellite receiver include generating the S-signals on the basis of the satellite signals by the Galileo system.

14. The method according to claim 1, where the generating of the S-signals by the satellite receiver include generating the S-signals on the basis of satellite signals by the GLANOSS System.

15. The method according to claim 1, where the generating of the R-signal generated by the reference clock is guided with a maximum predefined timing rate difference between the S-signal and the R-signal provided again in order to dispel the clock state difference between the R-signal and the S-signal accumulated during the failure.

16. An apparatus for carrying out a method according to claim 1.

17. The apparatus according to claim 16, further comprising a temperature-compensated quartz in the reference clock for deriving the R-signal.

18. The apparatus according to claim 16, further comprising an atomic clock in the reference clock for deriving the R-signal.

* * * * *